United States Patent [19]

Jensen et al.

[11] 4,146,907

[45] Mar. 27, 1979

[54] MULTIPLE FRAME PROJECTOR FOR TV VIEWING SYSTEM

[75] Inventors: Gerald A. Jensen, Wayzata; Robert E. Diesch, Rogers, both of Minn.

[73] Assignee: Pako Corporation, Minneapolis, Minn.

[21] Appl. No.: 861,181

[22] Filed: Dec. 16, 1977

Related U.S. Application Data

[62] Division of Ser. No. 767,335, Feb. 10, 1977, Pat. No. 4,086,836.

[51] Int. Cl.$^{2}$ .......................... B26D 7/00; H04N 7/18

[52] U.S. Cl. ........................................ 358/93; 83/521; 358/101; 358/102; 358/214; 358/225

[58] Field of Search ................. 358/93, 101, 102, 106, 358/214, 225; 83/520, 521

[56] References Cited

U.S. PATENT DOCUMENTS

| | | | |
|---|---|---|---|
| 2,935,559 | 5/1960 | Dornier | 358/106 |
| 3,719,116 | 3/1973 | Burton | 83/520 |
| 4,116,097 | 9/1978 | Graham | 83/520 |

*Primary Examiner*—Howard W. Britton
*Attorney, Agent, or Firm*—Kinney, Lange, Westman and Fairbairn

[57] ABSTRACT

A photographic packaging system includes a monitoring system which permits the operator to compare frames of the film negative with prints which are being cut so as to assure that the proper prints will be packaged with the corresponding film negatives. The monitoring system includes a television camera and display and a view splitter which is positioned between the television camera and the film negatives. The view splitter splits the field of view of the television camera so that the camera views two separate frames.

5 Claims, 7 Drawing Figures

FIG. 1
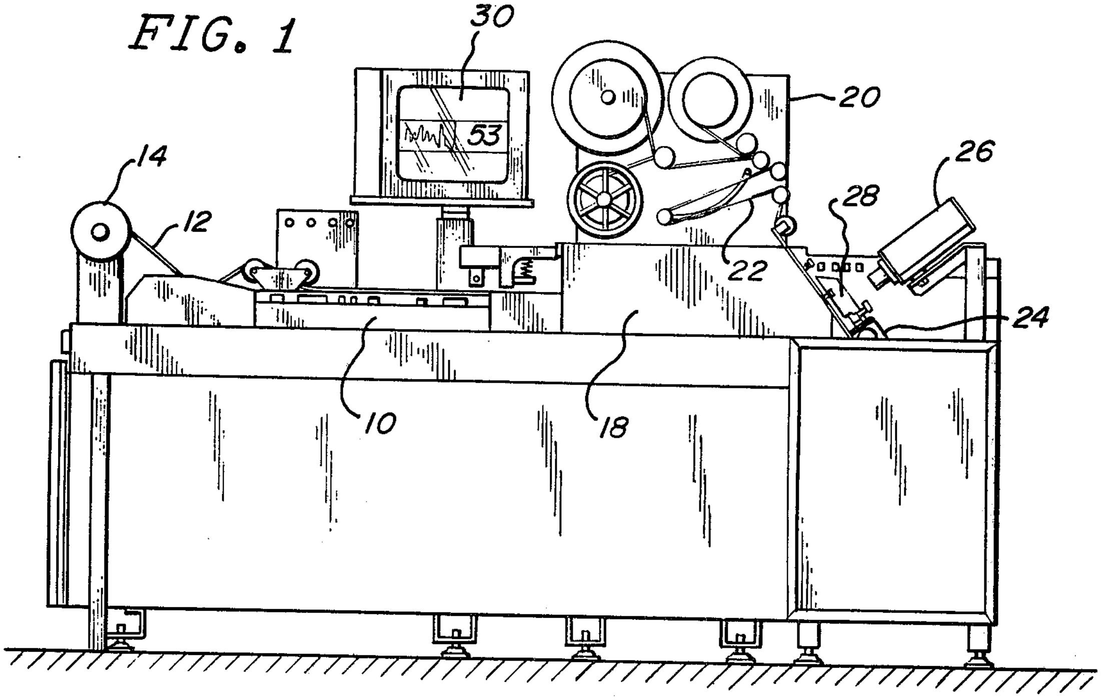
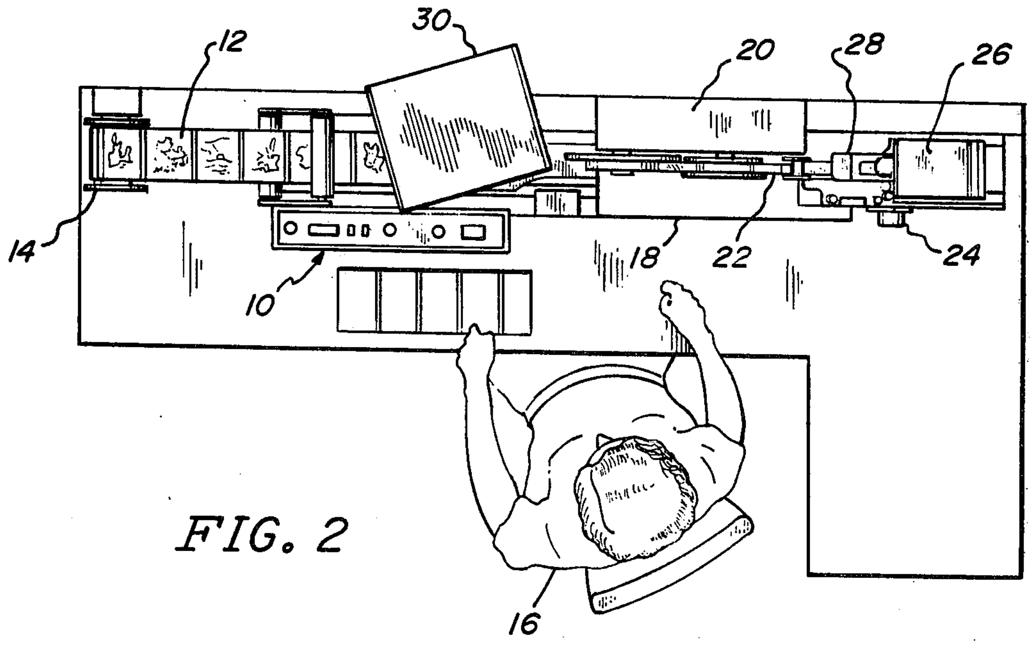
FIG. 2

FIG. 5
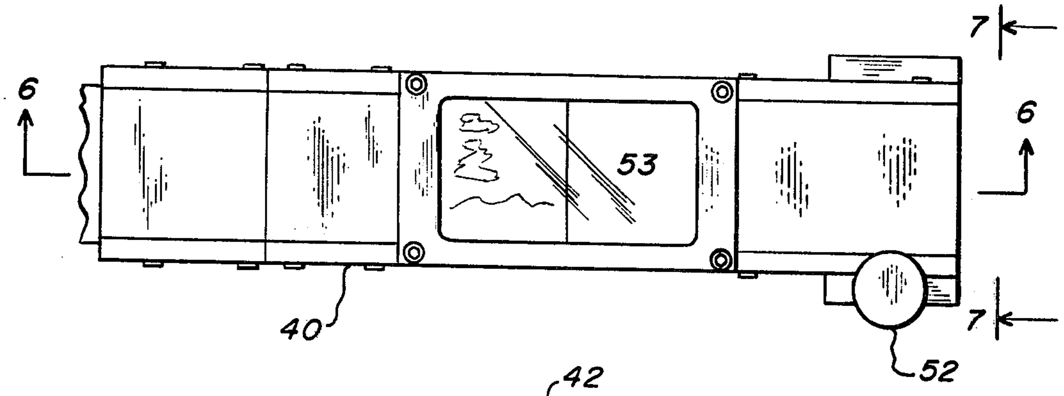
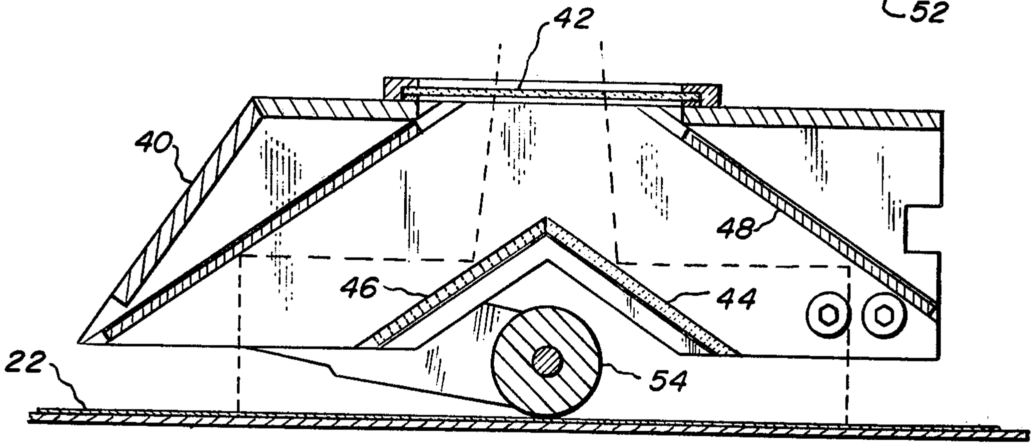
FIG. 6
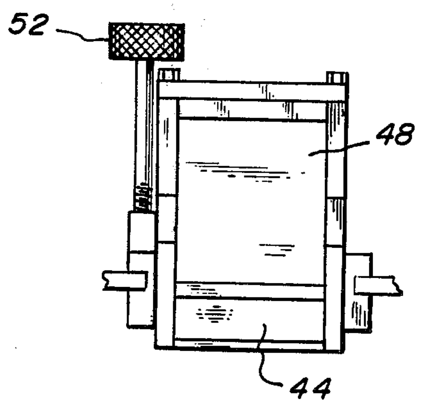
FIG. 7

MULTIPLE FRAME PROJECTOR FOR TV VIEWING SYSTEM

This is a division, of application Ser. No. 767,335, filed Feb. 10, 1977, now U.S. Pat. No. 4,086,836.

BACKGROUND OF THE INVENTION

The present invention relates to photographic packaging systems in which photographic prints and corresponding film negatives are sorted and packaged. In particular, the present invention relates to an improved monitoring system which permits the operator to compare frames of the film negatives with photographic prints to assure that the individual photographic prints will be packaged with their corresponding film negatives.

The high volume of work in photographic processing plants has led to an increasing need for automatic and semi-automatic equipment. Manual operations are an impediment to the work flow which is required for efficient and profitable operation.

One recent development has been photographic packaging systems such as the Pakomp II Photo Packer manufactured by Pako Corporation, which individually packages a large number of customer print orders. The Pakomp II Photo Packer includes a print cutter which cuts individual photographic prints from a large roll of photographic prints which contains prints for many different customer print orders. The prints are evaluated and are automatically sorted as either good, reject, or remake prints. The negatives corresponding to the photographic prints are cut from a continuous web or roll of film negatives in which the individual rolls of film have been spliced together for convenient handling in the photo finishing plant. A film cutter cuts the negatives into segments of three or four frames per segment and the segments of film negatives are packaged with the corresponding photographic prints for each customer order.

The operator must check to be certain that the film negatives being cut into segments correspond to the photographic prints then being cut by the print cutter. To assist in this monitoring, a television camera and closed circuit television monitor have been provided. The television camera monitors the film negatives so that the operator may compare the negatives being displayed on the television monitor with the photographic prints then positioned at the print cutter. As used in this patent application, the terms "television camera" and "television monitor" describe devices which produce both video and audio signals, or preferably produce only video signals.

SUMMARY OF THE INVENTION

Although the previous closed circuit television monitoring system has been generally satisfactory, a significant shortcoming in the system has been discovered. In particular, the small size of 110 format film has made it very difficult for the operator to compare the displayed film negatives on the television monitor with the photographic prints to be cut. In larger film formats such as 126 film and 35mm film, this is not a problem. Because of the popularity of 110 film, however, an improvement in the previous monitoring system is required.

In the present invention, this shortcoming of the previous system has been overcome. A view splitter has been provided between the television camera and the film negatives. The view splitter splits the field of view of the television camera into two separate fields of view. The first field of view includes a first frame of the film negatives, while the second field of view contains a second frame. The first and second frames are spaced apart or separated from one another on the continuous web of film negatives by a predetermined distance. The view splitter of the present invention allows the television camera to monitor two physically separated or spaced apart frames, while having a magnification sufficient to permit viewing of small size film.

BRIEF DESCRIPTION OF THE DRAWINGS

FIGS. 1 and 2 show front and top views, respectively of a photographic packaging system utilizing the improved monitoring system of the present invention.

FIG. 5 shows a top view of the view splitter.

FIG. 6 shows a cross sectional view of the view splitter shown in FIG. 5.

FIG. 7 shows an end view of the view splitter shown in FIG. 5.

DETAILED DESCRIPTION OF THE PREFERRED EMBODIMENTS

Figure 3:
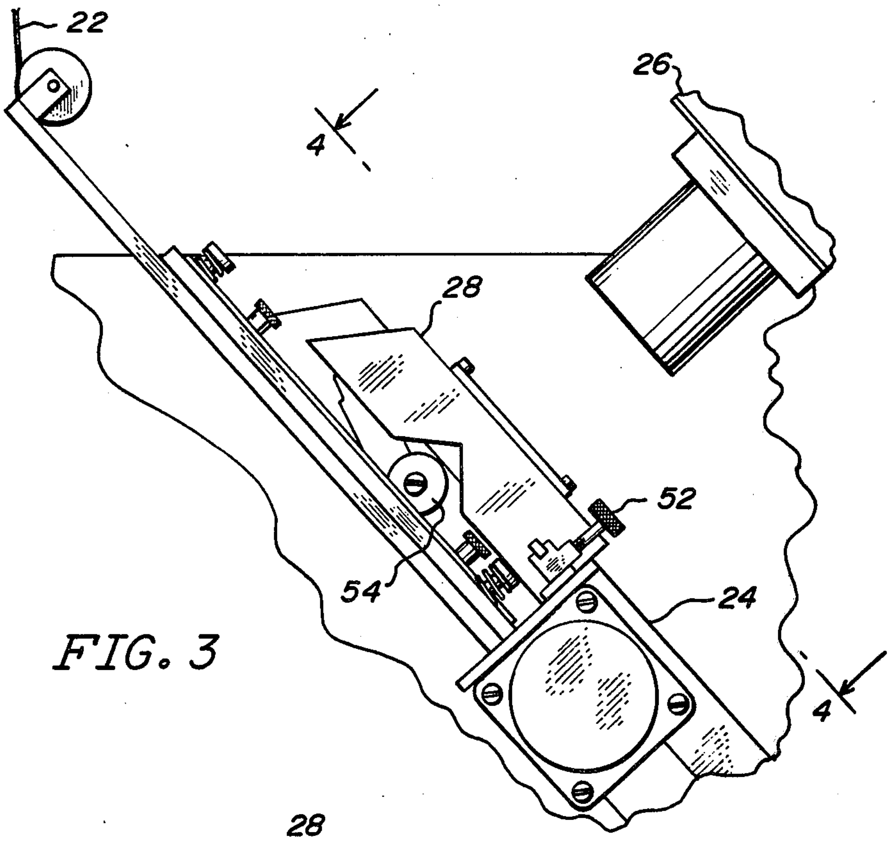
FIGS. 3 and 4 show front and top views, respectively, of the view splitter or multiple frame projector of the present invention in position proximate the film cutting knife.

FIGS. 1 and 2 show a photographic packaging system which cuts and sorts prints, cuts film negatives into segments and packages the segments of film negatives with corresponding photographic prints for each customer order.

Print cutter 10 automatically cuts individual prints from a continuous web of prints 12 supplied by roll 14. Operator 16 is stationed, as shown in FIG. 2, within easy view of the print cutter 10.

Print cutter 10 automatically cuts the prints from web 12 by sensing punch marks or notches between each individual print. In addition, web 12 typically includes an "end of order" punch mark or notch which indicates to the packaging system that the next series of prints on the web belong to a new customer order.

The prints which have been cut by cutter 10 are then sorted by print sorter 18 into three categories: good, remake, and reject. Print sorter 18 is located to the right of cutter 10 to receive the prints after they have been cut. Good prints are driven along by rollers within print sorter 18 while reject prints are guided automatically to a first holding station. Remakes are directed to a second holding station.

Negative file drive system 20 drives a continuous web 22 of film negatives to a film cutter mechanism 24. The film cutter 24 cuts the negatives into segments of three or four frames per segment, and the segments of film negatives for each customer order are then packaged with their corresponding photographic prints.

For proper operation of the system, it is essential that the photographic prints cut by print cutter 10 and the negative segments cut by film cutter 24 be placed in the same package. Operator 16 must check to be certain that the film negatives being cut correspond to the photographic prints then being cut by print cutter 10. Because of the physical separation of the print cutter and the film cutter, a closed circuit television system is provided to monitor the film negatives. The monitoring system includes television camera 26, view splitter or multiple frame projector 28, and television monitor or display 30.

With the television monitoring system, the operator is able to compare the image on monitor 30 with the prints about to be cut by print cutter 10. Monitor 30 has been positioned immediately above the print cutter 10 to allow easy viewing by operator 16.

In most applications, monitor 30 must display at least two frames of the film negatives. The first frame bears the "twin check" or order identification number while the second frame includes a scene which has been printed. The twin check number is typically placed on the last frame of the film roll as received from the customer. The film roll is then spliced together with many other individual film rolls to form continuous web 22. Film web 22 is fed to cutter 24 in such a fashion that the twin check number appears on the first frame of an order to reach cutter 24.

The frame bearing the twin check number is not generally printed. In order to determine whether the negatives about to be cut correspond to the prints about to be cut, the operator must view a frame different from the twin check bearing frame. It is best for this second frame to be physically separated from the twin check bearing frame by at least one frame, so that it is certain that the second frame does contain a scene which has been printed.

The present invention is intended to overcome the significant shortcoming which has been discovered in previous closed circuit television monitoring systems in photographic packaging systems. Previous closed circuit television monitoring systems have utilized the television camera which directly views the film negatives being fed to the film cutter. The field of view of the television camera must be sufficiently large that it encompasses at least two and preferably three or four frames of film so that the operator is certain to view on monitor 30 both the twin check bearing frame and also a frame containing a scene which has been printed. This presents no problem with film formats such as 126 type film and 35mm film. The small size of 110 format film, however, makes it difficult for the operator to compare the displayed film negatives on the television monitor with the photographic film to be cut. The image on the television monitor is so small that features of the displayed film negatives are hard to discern.

Simply increasing the magnification of the lens of the camera does not solve this shortcoming because it also reduces the field of view of the camera. It is not possible for the operator, therefore, to view two physically separated frames of film if sufficient magnification is provided to accommodate the small size of 110 type film.

Figure 4:
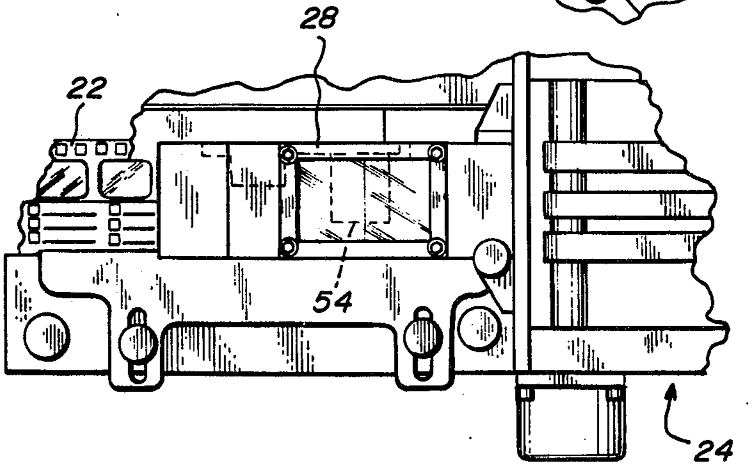

These shortcomings are overcome by the use of the view splitter 28 of the present invention. As shown in FIGS. 3 and 4, the view splitter is provided between the television camera 26 and the web of film negatives 22. The view splitter 28 is positioned immediately prior to film cutter 24 to allow television camera 26 to view the twin check bearing frame, which is the frame closest to the film cutting knife of film cutter 24.

View splitter 24 splits the field of view of television camera 26 into two separate fields of view. The first field of view includes the twin check bearing frame, while the second field view contains a second frame which is spaced or separated from the first frame by a predetermined distance. This allows the television camera to have sufficient magnification to permit viewing of the 110 size film while assuring that frames of film viewed are physically separated from one another on the continuous web of film negatives 22.

FIGS. 5, 6, and 7 show detailed views of the view splitter of the present invention. The view splitter includes a housing 40 in which are mounted a window 42, first and second mirrors 44 and 46, and third and fourth mirrors 48 and 50. Adjustment screw 52 allows adjustment of view splitter 28 along an axis parallel to the film axis thus permitting the selection of negative frames to be viewed. Roller 54, which is a drive roller that drives film 22, is also shown in FIGS. 5–7.

First and second mirrors 44 and 46 have their reflective surfaces mounted at an angle which is greater than 180° so as to form a roof-top reflector. Third mirror 48 is positioned so that it is essentially parallel to first mirror 44, and second mirror 50 is similarly positioned so that it is essentially parallel to second mirror 46.

In operation, light from a light source (not shown) under film 22 passes through the first frame (preferably the twin check bearing frame) which is closest to the film cutter. The light from the first frame is reflected by third reflector 48 to first reflector 44, which in turn reflects light through window 42 to television camera 26. Similarly, light from a second frame is reflected by fourth mirror 50 and a second mirror 46 through window 42 to television camera 26. The view splitter, therefore, splits the field of view of the television camera into two separated fields of view which contain two physically separated film frames. In the preferred embodiment of the present invention, the first and second frames are separated by at least one frame and preferably several frames. This assures that the second frame will be far enough from the twin check bearing frame that it will mostly likely contain a scene which has been printed and which will appear on the web of prints 12.

Although the present invention has been described with reference to preferred embodiments, workers skilled in the art will realize that changes may be made in form and detail without departing from the spirit and scope of the invention.

What is claimed is:

1. In a photographic packaging system for sorting the packaging photographic prints with corresponding film negatives, the improvement comprising:
   - camera means having a field of view including frames of the film negatives;
   - view splitter means for splitting the field of view of the camera means into first and second fields of view, the first field of view including at least a first frame and the second field of view containing at least a second frame, the first and second frames being separated from one another by a predetermined distance; and
   - display means for displaying simultaneously the first and second fields of view of the camera means.

2. The invention of claim 1 wherein the view splitter means comprises:
   - first and second mirror means for directing light from separate fields of view to the camera means;
   - third mirror means for directing light from the first field of view of the first mirror; and
   - fourth mirror means for directing light from the second field of view to the second mirror.

3. The invention of claim 2 wherein the first and third mirror means are parallel to one another, and the second and fourth mirror means are parallel to one another.

4. The invention of claim 3 wherein the first and second mirror means form a roof-top reflector.

5. The invention of claim 1 wherein the predetermined distance is at least equal to the width of one frame.

* * * * *